US009679249B2

(12) United States Patent
Best et al.

(10) Patent No.: US 9,679,249 B2
(45) Date of Patent: Jun. 13, 2017

(54) DYNAMIC RISK EVALUATION FOR PROPOSED INFORMATION TECHNOLOGY PROJECTS

(71) Applicant: Bank of America Corporation, Charlotte, NC (US)

(72) Inventors: Stephen F. Best, Indian Trail, NC (US); David A. Orr, Cornelius, NC (US); Ronald F. Stork, Bolingbrook, IL (US)

(73) Assignee: Bank of America Corporation, Charlotte, NC (US)

( * ) Notice: Subject to any disclaimer, the term of this patent is extended or adjusted under 35 U.S.C. 154(b) by 569 days.

(21) Appl. No.: 14/083,662

(22) Filed: Nov. 19, 2013

(65) Prior Publication Data
US 2015/0142700 A1 May 21, 2015

(51) Int. Cl.
*G06Q 10/00* (2012.01)
*G06N 5/04* (2006.01)

(52) U.S. Cl.
CPC ..................................... *G06N 5/04* (2013.01)

(58) Field of Classification Search
CPC ......... G06Q 10/00; G06Q 40/00; G06F 17/60
USPC .............................................. 705/7.11–7.29
See application file for complete search history.

(56) References Cited

U.S. PATENT DOCUMENTS

| | | | | |
|---|---|---|---|---|
| 6,810,383 B1 * | 10/2004 | Loveland | ............... | G06Q 10/06 705/7.13 |
| 6,817,613 B2 * | 11/2004 | Hasek | ................. | A63F 3/00063 273/256 |
| 7,359,865 B1 * | 4/2008 | Connor | .................. | G06Q 40/08 705/7.28 |
| 8,311,873 B2 * | 11/2012 | Dahl | ...................... | G06Q 10/06 705/7.11 |
| 8,374,905 B2 * | 2/2013 | Graham | ............ | G06F 17/30699 705/7.32 |
| 8,458,009 B1 * | 6/2013 | Southworth | ........... | G06Q 10/06 705/1.1 |

(Continued)

OTHER PUBLICATIONS

Oracle the Benefits of Risk Assessment for Projects, Portfolios, and Businesses, Jun. 2009, pp. 1-14.*

(Continued)

*Primary Examiner* — Romain Jeanty
(74) *Attorney, Agent, or Firm* — Banner & Witcoff, Ltd.; Michael A. Springs

(57) ABSTRACT

A user interface comprising a plurality of questions regarding a proposed information technology project may be generated. The user interface comprising the plurality of questions regarding the proposed information technology project may be communicated to a computing device. A plurality of responses input via the user interface may be received from the computing device. Each of the plurality of responses input via the user interface may correspond to one or more of the plurality of questions regarding the proposed information technology project. An initial risk assessment score for the proposed information technology project may be calculated based on the plurality of responses input via the user interface comprising the plurality of questions regarding the proposed information technology project. A determination may be made as to whether the initial risk assessment score for the proposed information technology project meets a predetermined threshold.

17 Claims, 8 Drawing Sheets

(56) References Cited

U.S. PATENT DOCUMENTS

| | | | | |
|---|---|---|---|---|
| 8,671,007 | B2* | 3/2014 | Chaar | G06Q 10/06 |
| | | | | 705/7.11 |
| 8,731,991 | B2* | 5/2014 | Altuwaijri | G06Q 10/06 |
| | | | | 705/301 |
| 8,781,869 | B2* | 7/2014 | Cantor | G06Q 10/06 |
| | | | | 705/7.12 |
| 9,128,801 | B2* | 9/2015 | Fox | G06F 8/36 |
| 2003/0158800 | A1* | 8/2003 | Pisello | G06Q 40/02 |
| | | | | 705/35 |
| 2006/0259336 | A1* | 11/2006 | Anas | G06Q 10/04 |
| | | | | 705/7.17 |
| 2007/0174161 | A1* | 7/2007 | Bullock | G06Q 10/06 |
| | | | | 705/35 |
| 2008/0270197 | A1* | 10/2008 | Rafter | G06Q 10/00 |
| | | | | 705/7.28 |
| 2009/0070188 | A1* | 3/2009 | Scott | G06Q 40/08 |
| | | | | 705/7.28 |
| 2013/0326469 | A1* | 12/2013 | Fox | G06F 8/36 |
| | | | | 717/101 |

OTHER PUBLICATIONS

Risk Management Task Group"Project Risk Management Handbook:A Scalable Approach", Dec. 2012, pp. 1-51.*

* cited by examiner

DYNAMIC RISK EVALUATION FOR PROPOSED INFORMATION TECHNOLOGY PROJECTS

BACKGROUND

Information technology is playing an ever more prominent role in modern organizations. As new technology becomes available, organizations are continually evaluating proposals for new information technology projects. While these proposed information technology projects may present an organization with an opportunity to increase efficiency, offer a new product or service, or otherwise benefit on or more stakeholders, their implementation may also expose the organization to additional risks. Accordingly, a need exists for providing dynamic risk evaluation for proposed information technology projects.

SUMMARY

The following presents a simplified summary in order to provide a basic understanding of some aspects of the disclosure. This summary is not an extensive overview of the disclosure. It is neither intended to identify key or critical elements of the disclosure nor to delineate the scope of the disclosure. The following summary merely presents some concepts of the disclosure in a simplified form as a prelude to the description below.

In accordance with one or more embodiments, a user interface comprising a plurality of questions regarding a proposed information technology project may be generated. The user interface comprising the plurality of questions regarding the proposed information technology project may be communicated to a computing device. A plurality of responses input via the user interface comprising the plurality of questions regarding the proposed information technology project may be received from the computing device. Each of the plurality of responses input via the user interface comprising the plurality of questions regarding the proposed information technology project may correspond to one or more of the plurality of questions regarding the proposed information technology project. An initial risk assessment score for the proposed information technology project may be calculated based on the plurality of responses input via the user interface comprising the plurality of questions regarding the proposed information technology project. A determination may be made as to whether the initial risk assessment score for the proposed information technology project meets a predetermined threshold.

Responsive to determining that the initial risk assessment score for the proposed information technology project does not meet the predetermined threshold, a risk assessment summary report indicating that the initial risk assessment score for the proposed information technology project does not meet the predetermined threshold and comprising a summary of the responses input via the user interface comprising the plurality of questions regarding the proposed information technology project may be generated. The risk assessment summary reporting indicating that the initial risk assessment score for the proposed information technology project does not meet the predetermined threshold and comprising the summary of the responses input via the user interface comprising the plurality of questions regarding the proposed information technology project may be communicated to the computing device.

Responsive to determining that the initial risk assessment score for the proposed information technology project meets the predetermined threshold, a user interface comprising a plurality of question sets may be generated. Each question set of the plurality of question sets may comprise one or more questions relating to a question of the plurality of questions regarding the proposed information technology project. The user interface comprising the plurality of question sets may be communicated to a different computing device. A plurality of responses input via the user interface comprising the plurality of question sets may be received from the different computing device. Each of the plurality of responses input via the user interface comprising the plurality of question sets may correspond to a question of the plurality of question sets. An adjusted risk assessment score for the proposed information technology project may be calculated based on the plurality of responses input via the user interface comprising the plurality of question sets. Calculating the adjusted risk assessment score for the proposed information technology project may include adjusting the initial risk assessment score for the proposed information technology project based on the plurality of responses input via the user interface comprising the plurality of question sets.

In some embodiments, an adjusted risk assessment summary report comprising the initial risk assessment score for the proposed information technology project and the adjusted risk assessment score for the proposed information technology project may be generated. The adjusted risk assessment summary report comprising the initial risk assessment score for the proposed information technology project and the adjusted risk assessment score for the proposed information technology project may be communicated to the computing device and/or the different computing device.

In some embodiments, calculating the initial risk assessment score for the proposed information technology project may include selecting a plurality of risk values based on the plurality of responses input via the user interface comprising the plurality of questions regarding the proposed information technology project and summing the plurality of values. Each risk value of the plurality of risk values may correspond to a response of the plurality of responses input via the user interface comprising the plurality of questions regarding the proposed information technology project.

In some embodiments, adjusting the initial risk assessment score for the proposed information technology project based on the plurality of responses input via the user interface may include selecting a plurality of risk adjustment values based on the plurality of responses input via the user interface comprising the plurality of question sets and reducing the initial risk assessment score for the proposed information technology project by the plurality of risk adjustment values.

In some embodiments, the user interface comprising the plurality of question sets may include at least one link to a policy document associated with one or more questions of a question set of the plurality of question sets. In such embodiments, responsive to the at least one link to the policy document associated with the one or more questions of the question set of the plurality of question sets being invoked, at least one of the one or more questions of the question set of the plurality of question sets and at least a portion of the policy document associated with the at least one of the one or more questions of the question set of the plurality of question sets may be contemporaneously displayed.

In some embodiments, the plurality of questions regarding the proposed information technology project may include at least one question regarding whether the proposed information technology project utilizes proprietary production data of a financial institution in an environment other than a production information technology environment of the financial institution, and the plurality of question sets may include at least one question set comprising questions regarding the environment other than the production information technology environment of the financial institution. Additionally or alternatively, the plurality of questions regarding the proposed information technology project may include at least one question regarding whether the proposed information technology project involves storing data with a third-party, transmitting data to a third-party, or processing data by a third-party, and the plurality of question sets may include at least one question set comprising questions regarding the third-party; the plurality of questions regarding the proposed information technology project may include at least one question regarding whether the proposed information technology project involves creating or altering an Internet-facing application, and the plurality of question sets may include at least one question set comprising questions regarding the Internet-facing application; the plurality of questions regarding the proposed information technology project may include at least one question regarding whether the proposed information technology project involves acquisition of new hardware or software infrastructure, and the plurality of question sets may include at least one question set comprising questions regarding the new hardware or software infrastructure; the plurality of questions regarding the proposed information technology project may include at least one question regarding whether the proposed information technology project involves an exception request to a data loss prevention policy, and the plurality of question sets may include at least one question set comprising questions regarding the exception request to the data loss prevention policy; and/or the plurality of questions regarding the proposed information technology project may include at least one question regarding whether the proposed information technology project is being initiated as a result of a legal or regulatory compliance audit, and the plurality of question sets may include at least one question set comprising questions regarding the legal or regulatory compliance audit.

Other details and features will be described in the sections that follow.

BRIEF DESCRIPTION OF THE DRAWINGS

The present disclosure is pointed out with particularity in the appended claims. Features of the disclosure will become more apparent upon a review of this disclosure in its entirety, including the drawing figures provided herewith.

Some features herein are illustrated by way of example, and not by way of limitation, in the figures of the accompanying drawings, in which like reference numerals refer to similar elements, and wherein.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Figure 1:
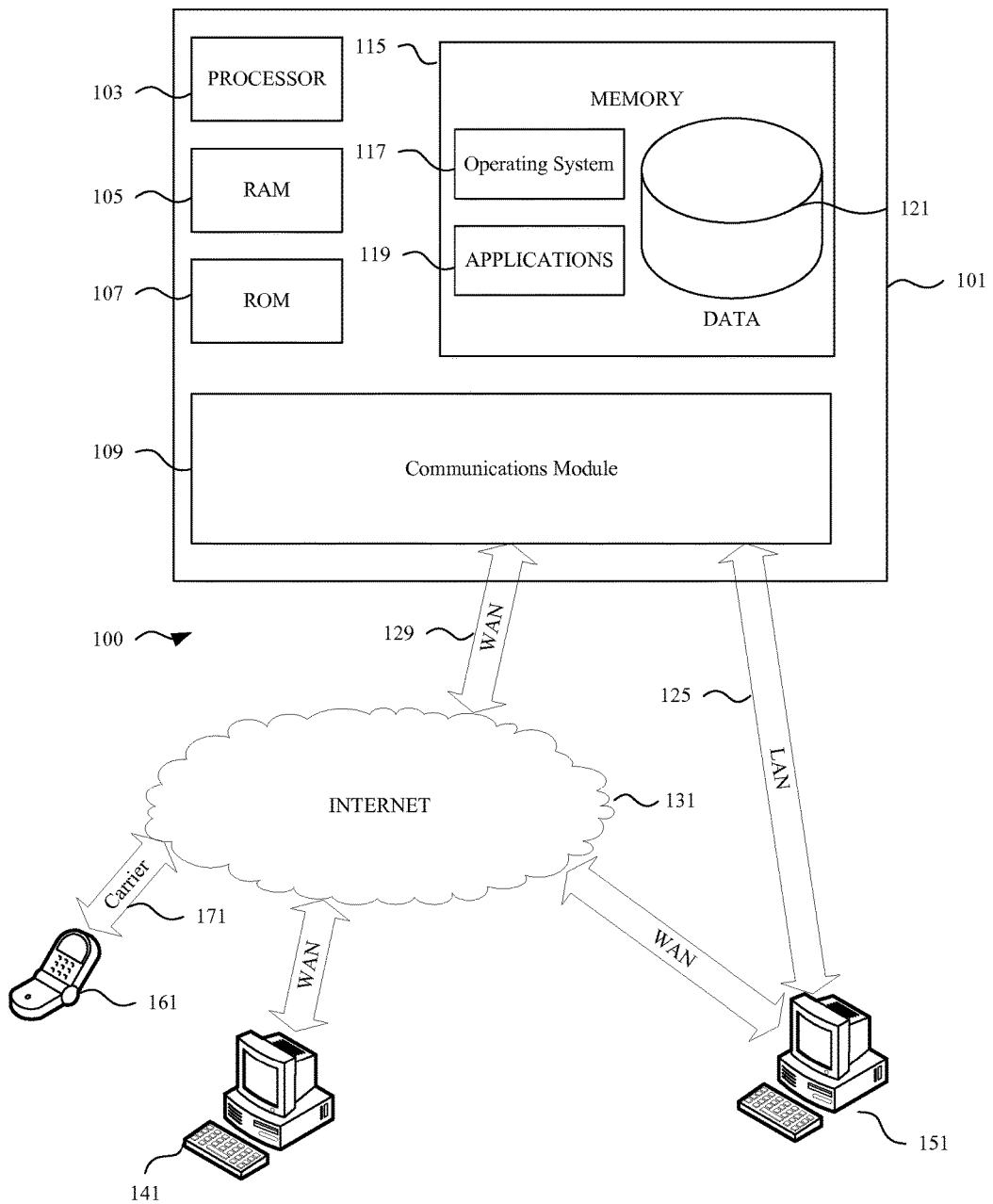
FIG. 1 depicts an illustrative operating environment in which various aspects of the present disclosure may be implemented in accordance with one or more example embodiments.

FIG. 1 depicts an illustrative operating environment in which various aspects of the present disclosure may be implemented in accordance with one or more example embodiments. Referring to FIG. 1, computing system environment 100 may be used according to one or more illustrative embodiments. Computing system environment 100 is only one example of a suitable computing environment and is not intended to suggest any limitation as to the scope of use or functionality contained in the disclosure. Computing system environment 100 should not be interpreted as having any dependency or requirement relating to any one or combination of components shown in illustrative computing system environment 100.

Computing system environment 100 may include computing device 101 having processor 103 for controlling overall operation of computing device 101 and its associated components, including random-access memory (RAM) 105, read-only memory (ROM) 107, communications module 109, and memory 115. Computing device 101 may include a variety of computer readable media. Computer readable media may be any available media that may be accessed by computing device 101, may be non-transitory, and may include volatile and nonvolatile, removable and non-removable media implemented in any method or technology for storage of information such as computer-readable instructions, object code, data structures, program modules, or other data. Examples of computer readable media may include random access memory (RAM), read only memory (ROM), electronically erasable programmable read only memory (EEPROM), flash memory or other memory technology, compact disk read-only memory (CD-ROM), digital versatile disks (DVD) or other optical disk storage, magnetic cassettes, magnetic tape, magnetic disk storage or other magnetic storage devices, or any other medium that can be used to store the desired information and that can be accessed by computing device 101.

Although not required, various aspects described herein may be embodied as a method, a data processing system, or as a computer-readable medium storing computer-executable instructions. For example, a computer-readable medium storing instructions to cause a processor to perform steps of a method in accordance with aspects of the disclosed embodiments is contemplated. For example, aspects of the method steps disclosed herein may be executed on a processor on computing device 101. Such a processor may execute computer-executable instructions stored on a computer-readable medium.

Software may be stored within memory 115 and/or storage to provide instructions to processor 103 for enabling computing device 101 to perform various functions. For example, memory 115 may store software used by computing device 101, such as operating system 117, application programs 119, and associated database 121. Also, some or all of the computer executable instructions for computing device 101 may be embodied in hardware or firmware. Although not shown, RAM 105 may include one or more applications representing the application data stored in RAM 105 while computing device 101 is on and corresponding software applications (e.g., software tasks), are running on computing device 101.

Communications module 109 may include a microphone, keypad, touch screen, and/or stylus through which a user of computing device 101 may provide input, and may also include one or more of a speaker for providing audio output and a video display device for providing textual, audiovisual and/or graphical output. Computing system environment 100 may also include optical scanners (not shown). Exemplary usages include scanning and converting paper documents, e.g., correspondence, receipts, and the like, to digital files.

Computing device 101 may operate in a networked environment supporting connections to one or more remote computing devices, such as computing devices 141, 151, and 161. Computing devices 141, 151, and 161 may be personal computing devices or servers that include any or all of the elements described above relative to computing device 101. Computing device 161 may be a mobile device (e.g., smart phone) communicating over wireless carrier channel 171.

The network connections depicted in FIG. 1 may include local area network (LAN) 125 and wide area network (WAN) 129, as well as other networks. When used in a LAN networking environment, computing device 101 may be connected to LAN 125 through a network interface or adapter in communications module 109. When used in a WAN networking environment, computing device 101 may include a modem in communications module 109 or other means for establishing communications over WAN 129, such as Internet 131 or other type of computer network. The network connections shown are illustrative and other means of establishing a communications link between the computing devices may be used. Various well-known protocols such as transmission control protocol/Internet protocol (TCP/IP), Ethernet, file transfer protocol (FTP), hypertext transfer protocol (HTTP) and the like may be used, and the system can be operated in a client-server configuration to permit a user to retrieve web pages from a web-based server. Any of various conventional web browsers can be used to display and manipulate data on web pages.

The disclosure is operational with numerous other general purpose or special purpose computing system environments or configurations. Examples of well-known computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like.

Figure 2:
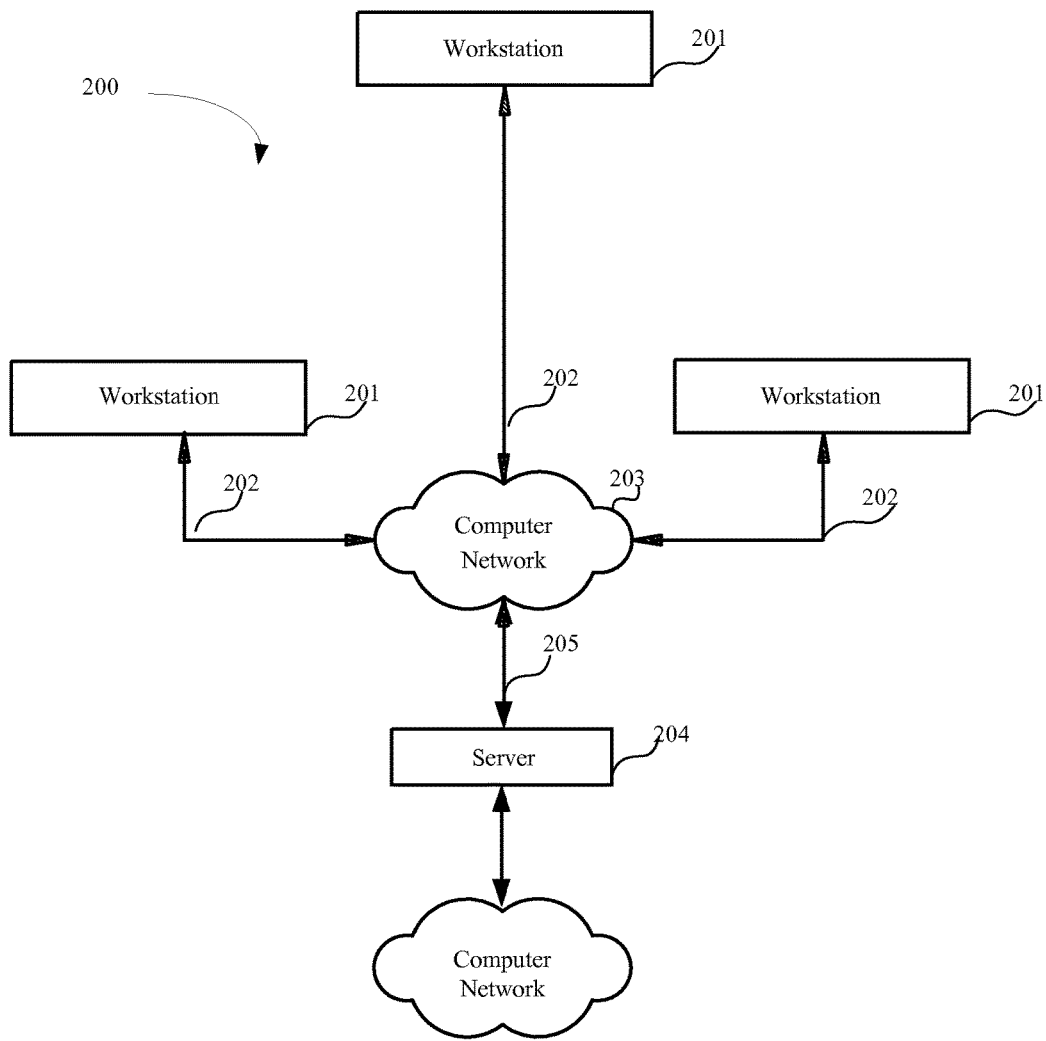
FIG. 2 depicts an illustrative block diagram of workstations and servers that may be used to implement the processes and functions of certain aspects of the present disclosure in accordance with one or more example embodiments.

FIG. 2 depicts an illustrative block diagram of workstations and servers that may be used to implement the processes and functions of certain aspects of the present disclosure in accordance with one or more example embodiments. Referring to FIG. 2, illustrative system 200 may be used for implementing example embodiments according to the present disclosure. As illustrated, system 200 may include one or more workstation computers 201. Workstation 201 may be, for example, a desktop computer, a smartphone, a wireless device, a tablet computer, a laptop computer, and the like. Workstations 201 may be local or remote, and may be connected by one of communications links 202 to computer network 203 that is linked via communications link 205 to server 204. In system 200, server 204 may be any suitable server, processor, computer, or data processing device, or combination of the same. Server 204 may be used to process the instructions received from, and the transactions entered into by, one or more participants.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, hard-wired links, as well as network types developed in the future, and the like.

Figure 3:
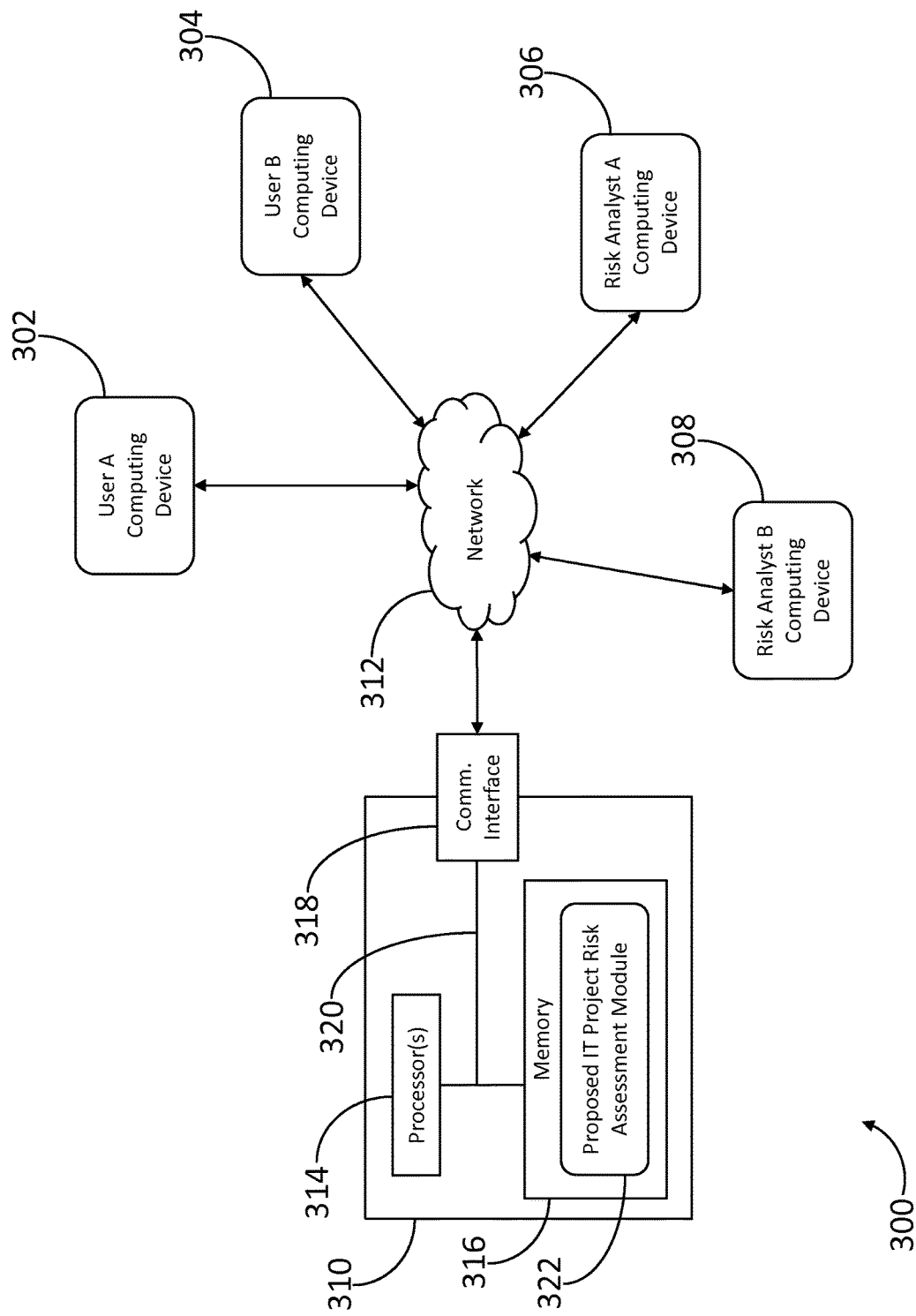
FIG. 3 depicts an illustrative computing environment for providing dynamic risk evaluation for proposed information technology projects in accordance with one or more example embodiments.

FIG. 3 depicts an illustrative computing environment for providing dynamic risk evaluation for proposed information technology projects in accordance with one or more example embodiments. Referring to FIG. 3, computing environment 300 may include one or more computing devices associated with an organization (e.g., a financial institution). For example, computing environment 300 may include computing devices 302, 304, 306, and 308. Computing device 302, 304, 306, and/or 308 may be any type of computing device capable of receiving a user interface, receiving input via the user interface, and communicating the received input to one or more other computing devices. For example, computing device 302, 304, 306, and/or 308 may be a desktop computer, laptop computer, tablet computer, smart phone, or the like. Computing environment 300 may also include computing platform 310 and network 312. Network 312 may interconnect one or more of computing devices 302, 304, 306, 308, and/or computing platform 310. Network 312 may include one or more sub-networks (e.g., LANs, WANs, or the like).

Computing platform 310 may include one or more processor(s) 314, memory 316, communication interface 318, and data bus 320. Data bus 320 may interconnect processor(s) 314, memory 316, and/or communication interface 318. Communication interface 318 may be a network interface configured to support communication between computing platform 310 and network 312, or one or more sub-networks thereof. Memory 316 may include one or more program modules comprising instructions that when executed by processor(s) 314 cause computing platform 310 to perform one or more functions described herein. For example, memory 316 may include proposed information technology project risk assessment module 322. As will be described in greater detail below, proposed information technology project risk assessment module 322 may comprise instructions that when executed by processor(s) 314 cause computing platform 310 to generate a user interface comprising a plurality of questions regarding a proposed information technology project. The instructions may further cause computing platform 310 to communicate the user interface comprising the plurality of questions regarding the proposed information technology project to a computing device (e.g., to computing device 302 via communication interface 318). Computing platform 310 may receive a plurality of responses input via the user interface comprising the plurality of questions regarding the proposed information technology project from the computing device (e.g., from computing device 302 via communication interface 318). Each of the plurality of responses input via the user interface comprising the plurality of questions regarding the proposed information technology project may correspond to one or more of the plurality of questions regarding the proposed information technology project. The instructions may cause computing platform 310 to calculate an initial risk assessment score for the proposed information technology project based on the plurality of responses input via the user interface comprising the plurality of questions regarding the proposed information technology project. The instructions may further cause computing platform 310 to make a determination as to whether the initial risk assessment score for the proposed information technology project meets a predetermined threshold.

Responsive to computing platform 310 determining that the initial risk assessment score for the proposed information technology project does not meet the predetermined threshold, the instructions may cause computing platform 310 to generate a risk assessment summary report indicating that the initial risk assessment score for the proposed information technology project does not meet the predetermined threshold. In some embodiments, the risk assessment summary report may include a summary of the responses input via the user interface comprising the plurality of questions regarding the proposed information technology project. Computing platform 310 may communicate the risk assessment summary reporting indicating that the initial risk assessment score for the proposed information technology project does not meet the predetermined threshold to the computing device (e.g., to computing device 302 via communication interface 318). In some embodiments, computing platform 310 may communicate the risk assessment summary reporting indicating that the initial risk assessment score for the proposed information technology project does not meet the predetermined threshold to one or more other computing devices (e.g., to computing device 306 and/or 308 via communication interface 318).

Responsive to computing platform 310 determining that the initial risk assessment score for the proposed information technology project meets the predetermined threshold, the instructions may cause computing platform 310 to generate a user interface comprising a plurality of question sets. Each question set of the plurality of question sets may comprise one or more questions relating to a question of the plurality of questions regarding the proposed information technology project. Computing platform 310 may communicate the user interface comprising the plurality of question sets to a different computing device (e.g., to computing device 306 via communication interface 318). Computing platform 310 may receive a plurality of responses input via the user interface comprising the plurality of question sets from the different computing device (e.g., from computing device 306 via communication interface 318). Each of the plurality of responses input via the user interface comprising the plurality of question sets may correspond to a question of the plurality of question sets. The instructions may further cause computing platform 310 to calculate an adjusted risk assessment score for the proposed information technology project based on the plurality of responses input via the user interface comprising the plurality of question sets. For example, in some embodiments, the instructions may cause computing platform 310 to calculate the adjusted risk assessment score for the proposed information technology project by adjusting the initial risk assessment score for the proposed information technology project based on the plurality of responses input via the user interface comprising the plurality of question sets. In some embodiments, the instructions may cause computing platform 310 to generate an adjusted risk assessment summary report comprising the initial risk assessment score for the proposed information technology project and the adjusted risk assessment score for the proposed information technology project. Computing platform 310 may communicate the adjusted risk assessment summary report comprising the initial risk assessment score for the proposed information technology project and the adjusted risk assessment score for the proposed information technology project to the computing device (e.g., to computing device 302 via communication interface 318) and/or the different computing device (e.g., to computing device 306 via communication interface 318).

Figure 4A:
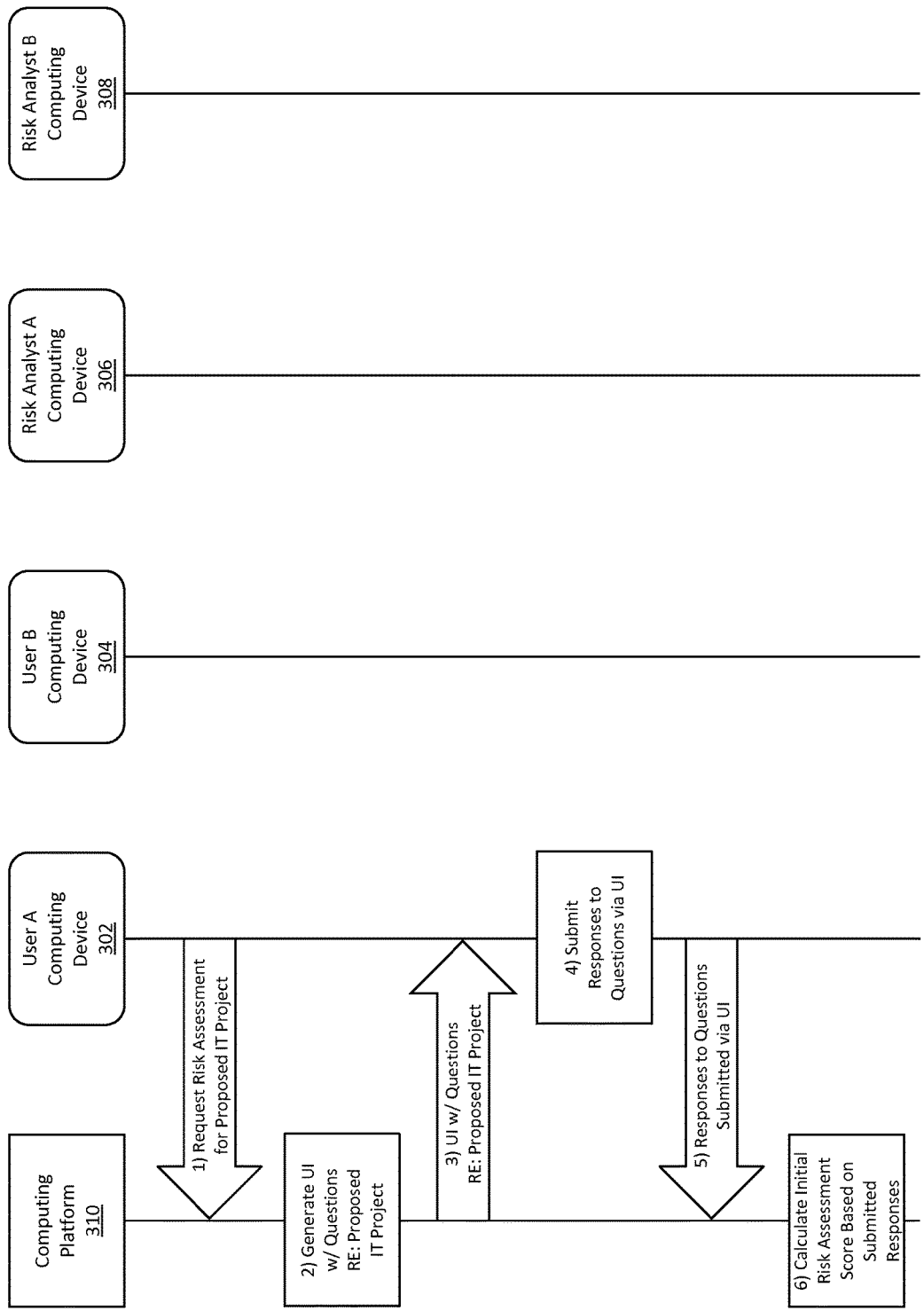
FIGS. 4A, 4B, 4C, and 4D depict an illustrative event sequence for providing dynamic risk evaluation for proposed information technology projects in accordance with one or more example embodiments.

FIGS. 4A, 4B, 4C, and 4D depict an illustrative event sequence for providing dynamic risk evaluation for proposed information technology projects in accordance with one or more example embodiments. Referring to FIG. 4A, at step 1, computing device 302 may communicate a request for a risk assessment for a proposed information technology project to computing platform 310. For example, a user of computing device 302 may be a project manager of an organization associated with computing environment 300 (e.g., a financial institution) that is proposing or sponsoring a proposed information technology project and may desire and/or be required (e.g., pursuant a policy of the organization) to submit a risk assessment for the proposed information technology project. At step 2, in response to receiving the request for the risk assessment for the proposed information technology project from computing device 302, computing platform 310 may generate a user interface comprising a plurality of questions regarding the proposed information technology project. In some embodiments, the plurality of questions regarding the proposed information technology project may include at least one question regarding whether the proposed information technology project utilizes proprietary production data of a financial institution in an environment other than a production information technology environment of the financial institution. Additionally or alternatively, the plurality of questions regarding the proposed information technology project may include at least one question regarding whether the proposed information technology project involves storing data with a third-party, transmitting data to a third-party, or processing data by a third-party, whether the proposed information technology project involves creating or altering an Internet-facing application, whether the proposed information technology project involves acquisition of new hardware or software infrastructure, whether the proposed information technology project involves an exception request to a data loss prevention policy, and/or whether the proposed information technology project is being initiated as a result of a legal or regulatory compliance audit.

At step 3, computing platform 310 may communicate the user interface comprising the plurality of questions regarding the proposed information technology project to computing device 302. At step 4, a user of computing device 302 may input or submit responses to one or more of the plurality of questions regarding the proposed information technology project via the user interface comprising the plurality of questions regarding the proposed information technology project. For example, the project manager of the organization that is proposing the information technology project may utilize computing device 302 to submit responses to one or more of the plurality of questions regarding the proposed information technology project via the user interface comprising the plurality of questions regarding the proposed information technology project (e.g., whether the proposed information technology project utilizes proprietary production data of a financial institution in an environment other than a production information technology environment of the financial institution, whether the proposed information technology project involves storing data with a third-party, transmitting data to a third-party, or processing data by a third-party, whether the proposed information technology project involves creating or altering an Internet-facing application, whether the proposed information technology project involves acquisition of new hardware or software infrastructure, whether the proposed information technology project involves an exception request to a data loss prevention policy, and/or whether the proposed information technology project is being initiated as a result of a legal or regulatory compliance audit). At step 5, computing device 302 may communicate the submitted responses to computing platform 310 (e.g., via network 312), which may receive them (e.g., via communication interface 318).

At step 6, computing platform 310 may calculate an initial risk assessment score for the proposed information technology project based on the responses submitted via the user interface comprising the plurality of questions regarding the proposed information technology project. In some embodiments, calculating the initial risk assessment score for the proposed information technology project may include selecting a plurality of risk values based on the plurality of responses input via the user interface comprising the plurality of questions regarding the proposed information technology project and summing the plurality of values. Each risk value of the plurality of risk values may correspond to a response of the plurality of responses input via the user interface comprising the plurality of questions regarding the proposed information technology project. For example, if a response indicates that the proposed information technology project utilizes proprietary production data of a financial institution in an environment other than a production information technology environment of the financial institution, a higher risk value may be selected than if the response indicates that the proposed information technology project does not utilize proprietary production data of a financial institution in an environment other than a production information technology environment of the financial institution.

Similarly, if a response indicates the proposed information technology project involves storing data with a third-party, transmitting data to a third-party, or processing data by a third-party, a higher risk value may be selected than if the response indicates that the proposed information technology project does not involve storing data with a third-party, transmitting data to a third-party, or processing data by a third-party; if a response indicates that the proposed information technology project involves creating or altering an Internet-facing application, a higher risk value may be selected than if the response indicates that the proposed information technology project does not involve creating or altering an Internet-facing application; if a response indicates that the proposed information technology project involves acquisition of new hardware or software infrastructure, a higher risk value may be selected than if the response indicates that the proposed information technology project does not involve acquisition of new hardware or software infrastructure; if a response indicates that the proposed information technology project involves an exception request to a data loss prevention policy, a higher risk value may be selected than if the response indicates that the proposed information technology project does not involve an exception request to a data loss prevention policy; and/or if a response indicates that the proposed information technology project is being initiated as a result of a legal or regulatory compliance audit, a higher risk value may be selected than if the response indicates that the proposed information technology project is not being initiated as a result of a legal or regulatory compliance audit.

Figure 4B:
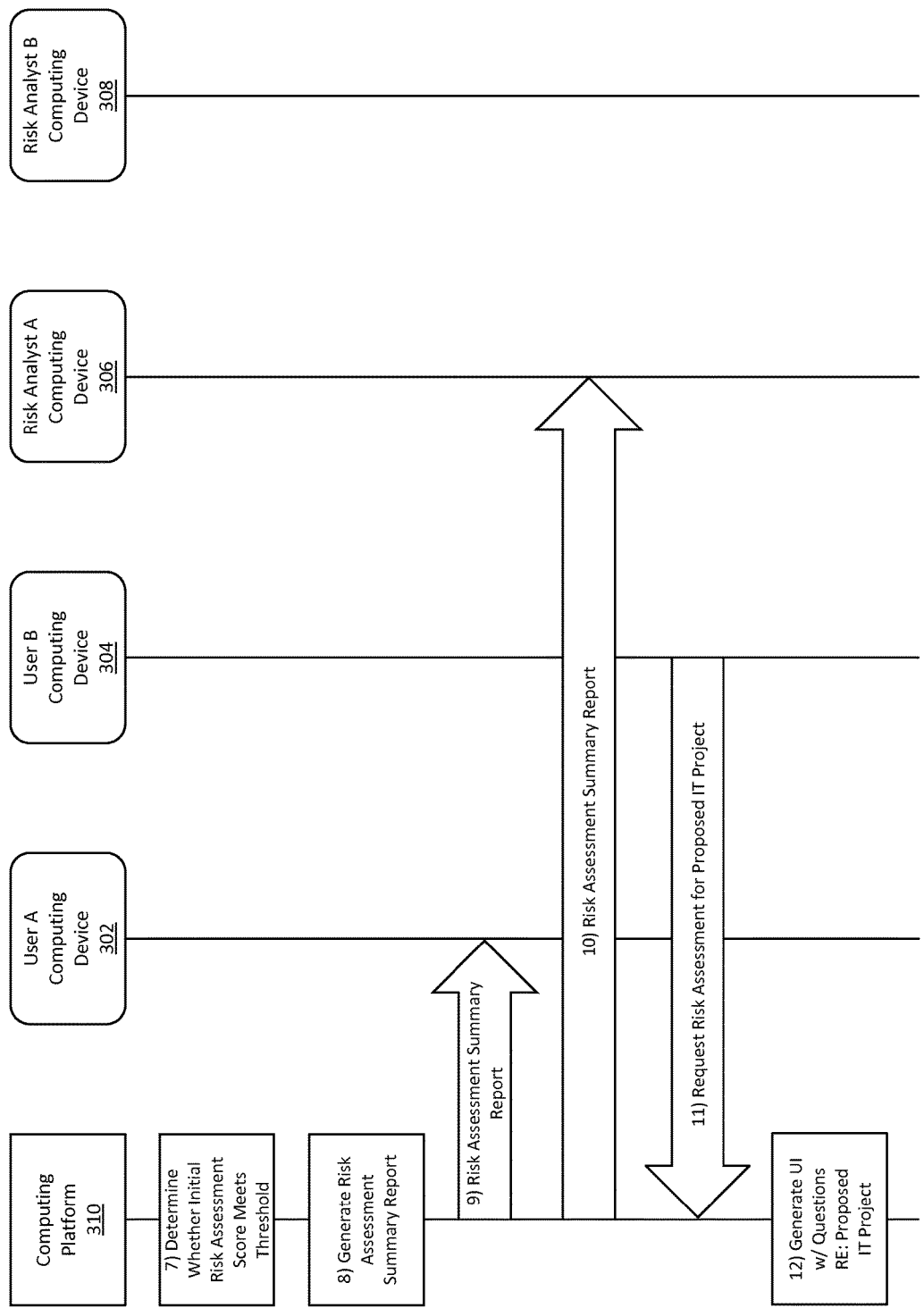

Referring to FIG. 4B, at step 7, computing platform 310 may make a determination as to whether the initial risk assessment score for the proposed information technology project meets a predetermined threshold. For example, computing platform 310 may be configured with a predetermined threshold initial risk assessment score. Computing platform 310 may compare the calculated initial risk assessment score for the proposed information technology project to the predetermined threshold initial risk assessment score and determine that the calculated initial risk assessment score for the proposed information technology project does not meet the predetermined threshold initial risk assessment score. At step 8, responsive to determining that the initial risk assessment score for the proposed information technology project does not meet the predetermined threshold, computing platform 310 may generate a risk assessment summary report indicating that the initial risk assessment score for the proposed information technology project does not meet the predetermined threshold. In some embodiments, the risk assessment summary report may include the initial risk assessment score. Additionally or alternatively, the risk assessment summary report may include a summary of the responses input via the user interface comprising the plurality of questions regarding the proposed information technology project (e.g., whether the proposed information technology project utilizes proprietary production data of a financial institution in an environment other than a production information technology environment of the financial institution, whether the proposed information technology project involves storing data with a third-party, transmitting data to a third-party, or processing data by a third-party, whether the proposed information technology project involves creating or altering an Internet-facing application, whether the proposed information technology project involves acquisition of new hardware or software infrastructure, whether the proposed information technology project involves an exception request to a data loss prevention policy, and/or whether the proposed information technology project is being initiated as a result of a legal or regulatory compliance audit).

At step 9, computing platform 310 may communicate the risk assessment summary report indicating that the initial risk assessment score for the proposed information technology project does not meet the predetermined threshold to computing device 302 (e.g., to the project manager of the organization that is proposing the information technology project). At step 10, computing platform 310 may communicate the risk assessment summary report indicating that the initial risk assessment score for the proposed information technology project does not meet the predetermined threshold to computing device 306. For example, computing device 306 may be associated with a risk analyst responsible for assessing risk for the proposed information technology project, and computing platform 310 may identify computing device 306 as being associated with the risk analyst responsible for assessing risk for the proposed information technology project, and communicate the risk assessment summary report indicating that the initial risk assessment score for the proposed information technology project does not meet the predetermined threshold to computing device 306.

Figure 4C:
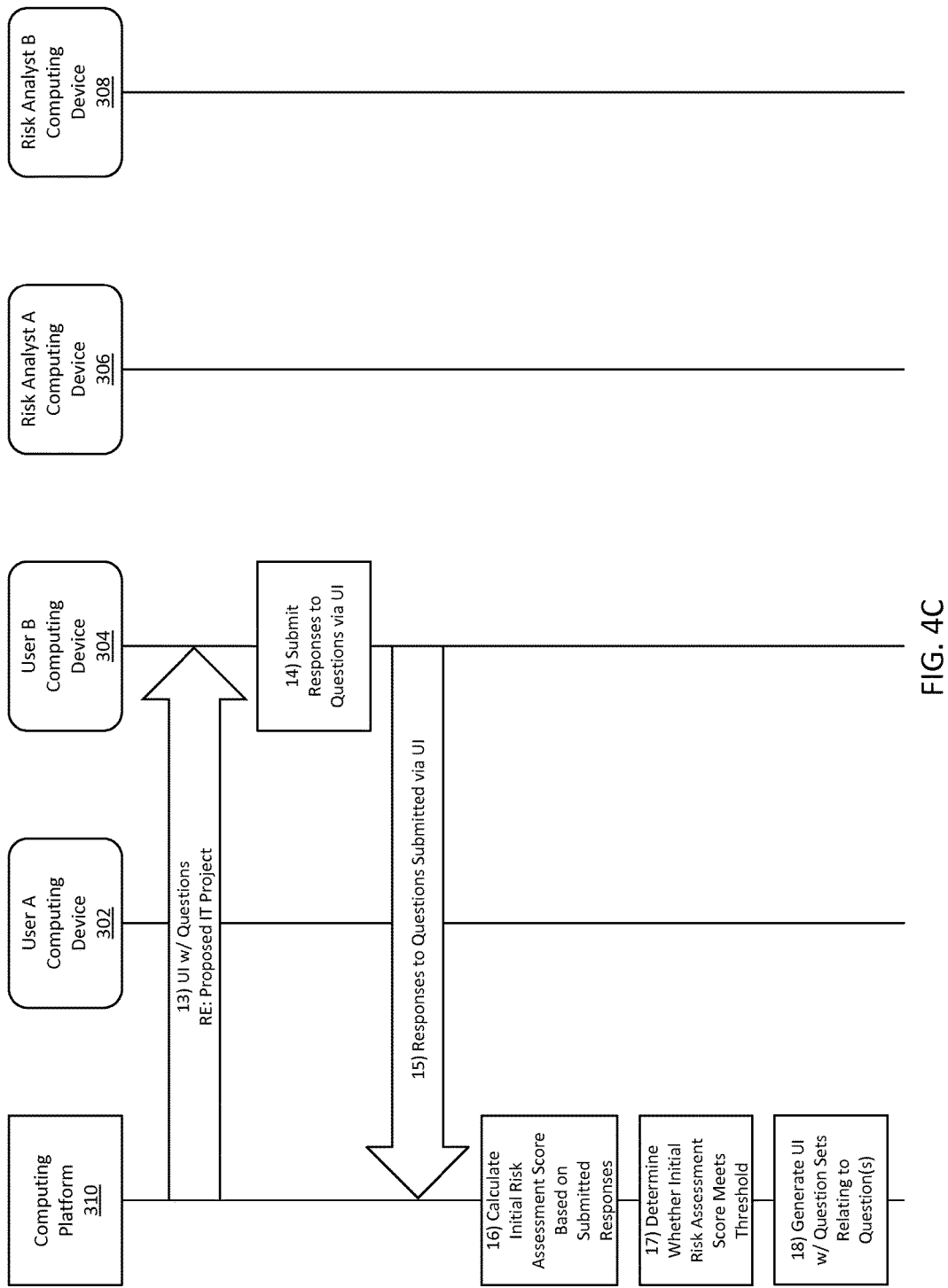

At step 11, computing device 304 may communicate a request for a risk assessment for a proposed information technology project to computing platform 310. For example, a user of computing device 304 may be a project manager of an organization associated with computing environment 300 (e.g., a financial institution) that is proposing or sponsoring a proposed information technology project and may desire and/or be required (e.g., pursuant a policy of the organization) to submit a risk assessment for the proposed information technology project. At step 12, in response to receiving the request for the risk assessment for the proposed information technology project from computing device 304, computing platform 310 may generate a user interface comprising a plurality of questions regarding the proposed information technology project. Referring to FIG. 4C, at step 13, computing platform 310 may communicate the user interface comprising the plurality of questions regarding the proposed information technology project to computing device 304. At step 14, a user of computing device 304 may input or submit responses to one or more of the plurality of questions regarding the proposed information technology project via the user interface comprising the plurality of questions regarding the proposed information technology project. For example, the project manager of the organization that is proposing the information technology project may utilize computing device 304 to submit responses to one or more of the plurality of questions regarding the proposed information technology project via the user interface comprising the plurality of questions regarding the proposed information technology project.

As indicated above, the plurality of questions regarding the proposed information technology project may include one or more questions regarding whether the proposed information technology project utilizes proprietary production data of a financial institution in an environment other than a production information technology environment of the financial institution, whether the proposed information technology project involves storing data with a third-party, transmitting data to a third-party, or processing data by a third-party, whether the proposed information technology project involves creating or altering an Internet-facing application, whether the proposed information technology project involves acquisition of new hardware or software infrastructure, whether the proposed information technology project involves an exception request to a data loss prevention policy, and/or whether the proposed information technology project is being initiated as a result of a legal or regulatory compliance audit. Similarly, the responses submitted via the user interface may indicate whether the proposed information technology project utilizes proprietary production data of a financial institution in an environment other than a production information technology environment of the financial institution, whether the proposed information technology project involves storing data with a third-party, transmitting data to a third-party, or processing data by a third-party, whether the proposed information technology project involves creating or altering an Internet-facing application, whether the proposed information technology project involves acquisition of new hardware or software infrastructure, whether the proposed information technology project involves an exception request to a data loss prevention policy, and/or whether the proposed information technology project is being initiated as a result of a legal or regulatory compliance audit.

At step 15, computing device 304 may communicate the submitted responses to computing platform 310 (e.g., via network 312), which may receive them (e.g., via communication interface 318). At step 16, computing platform 310 may calculate an initial risk assessment score for the proposed information technology project based on the responses submitted via the user interface comprising the plurality of questions regarding the proposed information technology project. At step 17, computing platform 310 may make a determination as to whether the initial risk assessment score for the proposed information technology project meets a predetermined threshold. For example, as indicated above, computing platform 310 may be configured with a predetermined threshold initial risk assessment score. Computing platform 310 may compare the calculated initial risk assessment score for the proposed information technology project to the predetermined threshold initial risk assessment score and determine that the calculated initial risk assessment score for the proposed information technology project meets the predetermined threshold initial risk assessment score. At step 18, responsive to determining that the initial risk assessment score for the proposed information technology project meets the predetermined threshold, computing platform 310 may generate a user interface comprising a plurality of question sets. Each question set of the plurality of question sets may comprise one or more questions relating to a question of the plurality of questions regarding the proposed information technology project. For example, if one or more of the responses received from computing device 304 indicates that the proposed information technology project utilizes proprietary production data of a financial institution in an environment other than a production information technology environment of the financial institution, the plurality of question sets may include at least one question set comprising questions regarding the environment other than the production information technology environment of the financial institution (e.g., whether the proprietary production data of the financial institution will be obfuscated in the environment other than the production information technology environment of the financial institution, whether the environment other than the production information technology environment of the financial institution is hosted by the financial institution or an external supplier of the financial institution, and/or whether proprietary production data of the financial institution is already utilized in the environment other than the production information technology environment of the financial institution).

Similarly, if one or more of the responses received from computing device 304 indicates that the proposed information technology project involves storing data with a third-party, transmitting data to a third-party, or processing data by a third-party, the plurality of question sets may include at least one question set comprising questions regarding the third-party (e.g., whether the third-party is an existing or new supplier, whether vendor management is involved in procurement of products or services from the third-party, whether an assessment of the third-party has been performed, whether there are any outstanding assessment findings for the third-party, whether the third-party will leverage one or more suppliers to transmit, store, or process confidential data associated with the proposed information technology project, and/or whether a contract exists with the supplier that contains up-to-date security language); if one or more of the responses received from computing device 304 indicates that the proposed information technology project involves creating or altering an Internet-facing application, the plurality of question sets may include at least one question set comprising questions regarding the Internet-facing application (e.g., whether the Internet-facing application is an existing Internet-facing application or whether the Internet-facing application will be developed as part of the proposed information technology project, whether the Internet-facing application meets requirements of an application development standard of the organization, whether the Internet-facing application was developed in-house or by an external supplier, what data elements will the Internet-facing application store, transmit, or process, and/or whether the Internet-facing application is a mobile application); if one or more of the responses received from computing device 304 indicates that the proposed information technology project involves acquisition of new hardware or software infrastructure, the plurality of question sets may include at least one question set comprising questions regarding the new hardware or software infrastructure (e.g., whether the new hardware or software has been previously classified by the organization, whether the new hardware or software is classified as declining or emerging, whether the new hardware or software is classified as not permitted within the organization, and/or whether the new hardware or software is classified as exempt from one or more risk assessment policies of the organization); if one or more of the responses received from computing device 304 indicates that the proposed information technology project involves an exception request to a data loss prevention policy, the plurality of question sets may include at least one question set comprising questions regarding the exception request to the data loss prevention policy; and/or if one or more of the responses received from computing device 304 indicates that the proposed information technology project is being initiated as a result of a legal or regulatory compliance audit, the plurality of question sets may include at least one question set comprising questions regarding the legal or regulatory compliance audit.

In some embodiments, the user interface comprising the plurality of question sets may include at least one link to a policy document associated with one or more questions of a question set of the plurality of question sets. For example, if one or more of the responses received from computing device 304 indicates that the proposed information technology project involves creating or altering an Internet-facing application, the user interface comprising the plurality of question sets may include at least one link to a policy document associated with an application development standard of the organization.

Figure 4D:
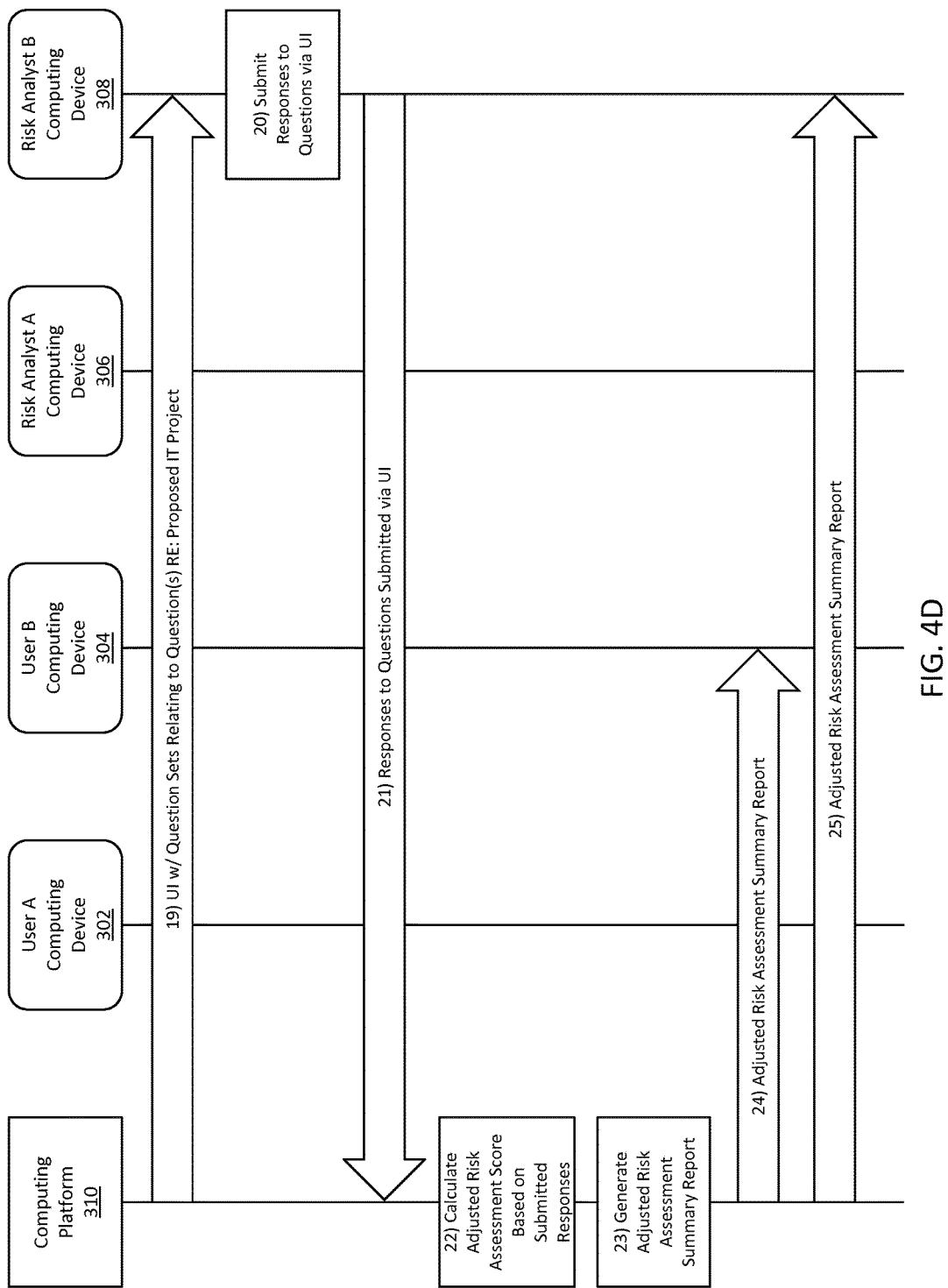

Referring to FIG. 4D, at step 19, computing platform 310 may communicate the user interface comprising the plurality of question sets to computing device 308. For example, computing device 308 may be associated with a risk analyst responsible for assessing risk for the proposed information technology project, and computing platform 310 may identify computing device 308 as being associated with the risk analyst responsible for assessing risk for the proposed information technology project, and communicate the user interface comprising the plurality of question sets to computing device 308. At step 20, a user of computing device 308 may input or submit responses to one or more questions of the plurality of question sets via the user interface comprising the plurality of question sets. For example, the risk analyst responsible for assessing risk for the proposed information technology project may utilize computing device 308 to submit responses to one or more questions of the plurality of question sets via the user interface comprising the plurality of question sets (e.g., if the question sets include a question set comprising questions regarding the Internet-facing application, whether the Internet-facing application is an existing Internet-facing application or whether the Internet-facing application will be developed as part of the proposed information technology project, whether the Internet-facing application meets requirements of an application development standard of the organization, whether the Internet-facing application was developed in-house or by an external supplier, what data elements will the Internet-facing application store, transmit, or process, and/or whether the Internet-facing application is a mobile application).

As indicated above, in some embodiments, the user interface comprising the plurality of question sets may include at least one link to a policy document associated with one or more questions of a question set of the plurality of question sets. For example, if one or more of the responses received from computing device 304 indicates that the proposed information technology project involves creating or altering an Internet-facing application, the user interface comprising the plurality of question sets may include at least one link to a policy document associated with an application development standard of the organization. In such embodiments, responsive to the at least one link to the policy document associated with the one or more questions of the question set of the plurality of question sets being invoked, at least one of the one or more questions of the question set of the plurality of question sets and at least a portion of the policy document associated with the at least one of the one or more questions of the question set of the plurality of question sets may be contemporaneously displayed. For example, if a user of computing device 308 (e.g., the risk analyst responsible for assessing risk for the proposed information technology project) invokes the at least one link to the policy document associated with the application development standard of the organization, computing device 308 may contemporaneously display at least a portion of the policy document associated with the application development standard of the organization and at least one of the one or more questions of the question set of the plurality of question sets (e.g., whether the Internet-facing application meets requirements of the application development standard of the organization).

At step 21, computing device 308 may communicate the submitted responses to computing platform 310 (e.g., via network 312), which may receive them (e.g., via communication interface 318). At step 22, computing platform 310 may calculate an adjusted risk assessment score for the proposed information technology project based on the plurality of responses input via the user interface comprising the plurality of question sets (e.g., the responses received from computing device 308). Computing device 308 may calculate the adjusted risk assessment score for the proposed information technology project by adjusting the initial risk assessment score for the proposed information technology project based on the plurality of responses input via the user interface comprising the plurality of question sets. In some embodiments, adjusting the initial risk assessment score for the proposed information technology project based on the plurality of responses input via the user interface comprising the plurality of question sets may include selecting a plurality of risk adjustment values based on the plurality of responses input via the user interface comprising the plurality of question sets and reducing the initial risk assessment score for the proposed information technology project by the plurality of risk adjustment values. For example, each potential response to a question of a question set of the plurality of question sets may be associated with a risk adjustment value, which may be selected based on the response selected for the question (e.g., by the risk analyst responsible for assessing risk for the proposed information technology project). The initial risk assessment score for the proposed information technology project may then be reduced by the selected risk adjustment values.

At step 23, computing platform 310 may generate an adjusted risk assessment summary report. The adjusted risk assessment summary report may include the initial risk assessment score for the proposed information technology project and the adjusted risk assessment score for the proposed information technology project. At step 24, computing platform 310 may communicate the adjusted risk assessment summary report to computing device 304 (e.g., to the project manager of the organization that is proposing the information technology project). At step 25, computing platform 310 may communicate the adjusted risk assessment summary report to computing device 308 (e.g., the risk analyst responsible for assessing risk for the proposed information technology project).

Figure 5:
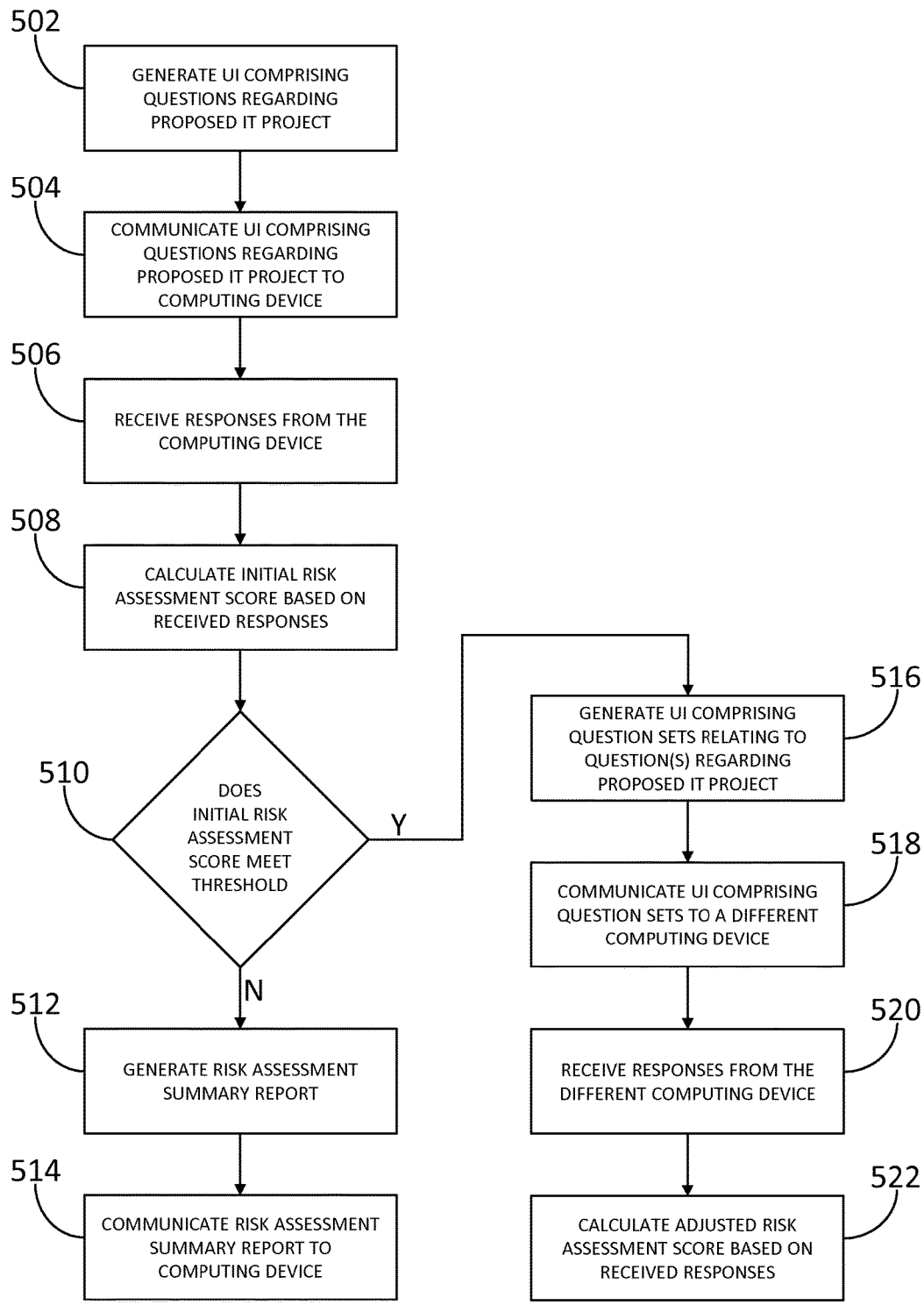
FIG. 5 depicts an illustrative method for providing dynamic risk evaluation for proposed information technology projects in accordance with one or more example embodiments.

FIG. 5 depicts an illustrative method for providing dynamic risk evaluation for proposed information technology projects in accordance with one or more example embodiments. Referring to FIG. 5, at step 502, a user interface comprising a plurality of questions regarding a proposed information technology project may be generated. For example, computing platform 310 may generate a user interface comprising a plurality of questions regarding an information technology project proposed by the project manager utilizing computing device 302. At step 504, the user interface comprising the plurality of questions regarding the proposed information technology project may be communicated to a computing device. For example, computing platform 310 may communicate the user interface comprising the plurality of questions regarding the information technology project proposed by the project manager utilizing computing device 302 to computing device 302. At step 506, a plurality of responses input via the user interface comprising the plurality of questions regarding the proposed information technology project may be received from the computing device. For example, computing platform 310 may receive a plurality of responses input via the user interface comprising the plurality of questions regarding the information technology project proposed by the project manager utilizing computing device 302 from computing device 302. At step 508, an initial risk assessment score for the proposed information technology project may be calculated based on the plurality of responses input via the user interface comprising the plurality of questions regarding the proposed information technology project. For example, computing platform 310 may calculate an initial risk assessment score for the information technology project proposed by the project manager utilizing computing device 302 based on the plurality of responses received from computing device 302.

At step 510, a determination may be made as to whether the initial risk assessment score for the proposed information technology project meets a predetermined threshold. For example, computing platform 310 may determine that the initial risk assessment score for the information technology project proposed by the project manager utilizing computing device 302 does not meet the predetermined threshold. At step 512, responsive to determining that the initial risk assessment score for the proposed information technology project does not meet the predetermined threshold, a risk assessment summary report indicating that the initial risk assessment score for the proposed information technology project does not meet the predetermined threshold and comprising a summary of the responses input via the user interface comprising the plurality of questions regarding the proposed information technology project may be generated. For example, responsive to determining that the initial risk assessment score for the information technology project proposed by the project manager utilizing computing device 302 does not meet the predetermined threshold, computing platform 310 may generate a risk assessment summary report indicating that the initial risk assessment score for the information technology project proposed by the project manager utilizing computing device 302 does not meet the predetermined threshold. The risk assessment summary report may include a summary of the plurality of responses received from computing device 302. At step 514, the risk assessment summary reporting indicating that the initial risk assessment score for the proposed information technology project does not meet the predetermined threshold and comprising the summary of the responses input via the user interface comprising the plurality of questions regarding the proposed information technology project may be communicated to the computing device. For example, computing platform 310 may communicate the risk assessment summary report indicating that the initial risk assessment score for the information technology project proposed by the project manager utilizing computing device 302 does not meet the predetermined threshold to computing device 302.

Returning to step 510, responsive to determining that the initial risk assessment score for the proposed information technology project meets the predetermined threshold, at step 516, a user interface comprising a plurality of question sets may be generated. For example, computing platform 310 may determine that the initial risk assessment score for the information technology project proposed by the project manager utilizing computing device 304 meets the predetermined threshold, and, responsive to determining that the initial risk assessment score for the information technology project proposed by the project manager utilizing computing device 304 meets the predetermined threshold, computing platform 310 may generate a user interface comprising a plurality of question sets. At step 518, the user interface comprising the plurality of question sets may be communicated to a different computing device. For example, computing platform 310 may communicate the user interface comprising the plurality of question sets to computing device 308. At step 520, a plurality of responses input via the user interface comprising the plurality of question sets may be received from the different computing device. For example, computing platform 310 may receive a plurality of responses input via the user interface comprising the plurality of question sets (e.g., by the risk analyst responsible for assessing risk for the information technology project proposed by the project manager utilizing computing device 304) from computing device 308. At step 522, an adjusted risk assessment score for the proposed information technology project may be calculated based on the plurality of responses input via the user interface comprising the plurality of question sets. For example, computing platform 310 may calculate an adjusted risk assessment score for the information technology project proposed by the project manager utilizing computing device 304 based on the plurality of responses received from computing device 308.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may comprise one or more non-transitory computer-readable media.

As described herein, the various methods and acts may be operative across one or more computing servers and one or more networks. The functionality may be distributed in any manner, or may be located in a single computing device (e.g., a server, a client computer, and the like).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:
1. A method comprising:
  at a computing platform comprising at least one processor, a communication interface, and a memory comprising a proposed information technology project risk assessment module:
    generating, by the at least one processor, a user interface comprising a plurality of questions regarding a proposed information technology project;
    establishing, by the at least one processor, via the communication interface, a communications link between the computing platform and a computing device;
    while the communications link between the computing platform and the computing device is active, communicating, via the communication interface and to the computing device, the user interface comprising the plurality of questions regarding the proposed information technology project, wherein communicating the user interface comprising the plurality of questions regarding the proposed information technology project causes the computing device to display the user interface comprising the plurality of questions regarding the proposed information technology project;
    receiving, via the communication interface and from the computing device, a plurality of responses input via the user interface comprising the plurality of questions regarding the proposed information technology project, wherein each of the plurality of responses input via the user interface comprising the plurality of questions regarding the proposed information technology project corresponds to one or more of the plurality of questions regarding the proposed information technology project;
    calculating, by the at least one processor and based on the plurality of responses input via the user interface comprising the plurality of questions regarding the proposed information technology project, an initial risk assessment score for the proposed information technology project;
    determining, by the at least one processor, whether the initial risk assessment score for the proposed information technology project meets a predetermined threshold; and
    responsive to determining that the initial risk assessment score for the proposed information technology project meets the predetermined threshold:
      generating, by the at least one processor, a user interface comprising a plurality of question sets, each question set of the plurality of question sets comprising one or more questions relating to a question of the plurality of questions regarding the proposed information technology project;
      communicating, via the communication interface and to a different computing device, the user interface comprising the plurality of question sets, wherein communicating the user interface comprising the plurality of question sets causes the different computing device to display the user interface comprising the plurality of question sets;
      receiving, via the communication interface and from the different computing device, a plurality of responses input via the user interface comprising the plurality of question sets, wherein each of the plurality of responses input via the user interface comprising the plurality of question sets corresponds to a question of the plurality of question sets; and
      calculating, by the at least one processor and based on the plurality of responses input via the user interface comprising the plurality of question sets, an adjusted risk assessment score for the proposed information technology project, wherein calculating the adjusted risk assessment score for the proposed information technology project comprises adjusting the initial risk assessment score for the proposed information technology project based on the plurality of responses input via the user interface comprising the plurality of question sets.

2. The method of claim 1, comprising:
generating, by the at least one processor, an adjusted risk assessment summary report comprising the initial risk assessment score for the proposed information technology project and the adjusted risk assessment score for the proposed information technology project; and
communicating, via the communication interface and to at least one of the computing device or the different computing device, the adjusted risk assessment summary report comprising the initial risk assessment score for the proposed information technology project and the adjusted risk assessment score for the proposed information technology project.

3. The method of claim 1, wherein calculating the initial risk assessment score for the proposed information technology project comprises:
selecting a plurality of risk values based on the plurality of responses input via the user interface comprising the plurality of questions regarding the proposed information technology project, each risk value of the plurality of risk values corresponding to a response of the plurality of responses input via the user interface comprising the plurality of questions regarding the proposed information technology project; and
summing the plurality of risk values.

4. The method of claim 3, wherein adjusting the initial risk assessment score for the proposed information technology project based on the plurality of responses input via the user interface comprising the plurality of question sets comprises:
selecting a plurality of risk adjustment values based on the plurality of responses input via the user interface comprising the plurality of question sets, each risk adjustment value of the plurality of risk adjustment values corresponding to a response of the plurality of responses input via the user interface comprising the plurality of question sets; and
reducing the initial risk assessment score for the proposed information technology project by the plurality of risk adjustment values.

5. The method of claim 1, wherein the user interface comprising the plurality of question sets comprises at least one link to a policy document associated with one or more questions of a question set of the plurality of question sets.

6. The method of claim 5, comprising:
responsive to the at least one link to the policy document associated with the one or more questions of the question set of the plurality of question sets being invoked, contemporaneously displaying at least one of the one or more questions of the question set of the plurality of question sets and at least a portion of the policy document associated with the at least one of the one or more questions of the question set of the plurality of question sets.

7. The method of claim 1, wherein the plurality of questions regarding the proposed information technology project comprises at least one question regarding whether the proposed information technology project utilizes proprietary production data of a financial institution in an environment other than a production information technology environment of the financial institution, and wherein the plurality of question sets comprises at least one question set comprising questions regarding the environment other than the production information technology environment of the financial institution.

8. The method of claim 7, wherein the questions regarding the environment other than the production information technology environment of the financial institution comprises a question regarding whether the proprietary production data of the financial institution will be obfuscated in the environment other than the production information technology environment of the financial institution, a question regarding whether the environment other than the production information technology environment of the financial institution is hosted by the financial institution or an external supplier of the financial institution, and a question regarding whether proprietary production data of the financial institution is already utilized in the environment other than the production information technology environment of the financial institution.

9. The method of claim 1, wherein the plurality of questions regarding the proposed information technology project comprises at least one question regarding whether the proposed information technology project involves storing data with a third-party, transmitting data to a third-party, or processing data by a third-party, and wherein the plurality of question sets comprises at least one question set comprising questions regarding the third-party.

10. The method of claim 1, wherein the plurality of questions regarding the proposed information technology project comprises at least one question regarding whether the proposed information technology project involves creating or altering an Internet-facing application, and wherein the plurality of question sets comprises at least one question set comprising questions regarding the Internet-facing application.

11. The method of claim 1, wherein the plurality of questions regarding the proposed information technology project comprises at least one question regarding whether the proposed information technology project involves acquisition of new hardware or software infrastructure, and wherein the plurality of question sets comprises at least one question set comprising questions regarding the new hardware or software infrastructure.

12. The method of claim 1, wherein the plurality of questions regarding the proposed information technology project comprises at least one question regarding whether the proposed information technology project involves an exception request to a data loss prevention policy, and wherein the plurality of question sets comprises at least one question set comprising questions regarding the exception request to the data loss prevention policy.

13. The method of claim 1, wherein the plurality of questions regarding the proposed information technology project comprises at least one question regarding whether the proposed information technology project is being initiated as a result of a legal or regulatory compliance audit, and wherein the plurality of question sets comprises at least one question set comprising questions regarding the legal or regulatory compliance audit.

14. An apparatus comprising:
at least one processor; and
a memory comprising a proposed information technology project risk assessment module and storing instructions that when executed by the at least one processor cause the apparatus to:

generate a user interface comprising a plurality of questions regarding a proposed information technology project;

establish, via a communication interface, a communications link between the apparatus and a computing device;

while the communications link between the apparatus and the computing device is active, communicate, to the computing device, the user interface comprising the plurality of questions regarding the proposed information technology project, wherein communicating the user interface comprising the plurality of questions regarding the proposed information technology project causes the computing device to display the user interface comprising the plurality of questions regarding the proposed information technology project;

receive, from the computing device, a plurality of responses input via the user interface comprising the plurality of questions regarding the proposed information technology project, wherein each of the plurality of responses input via the user interface comprising the plurality of questions regarding the proposed information technology project corresponds to one or more of the plurality of questions regarding the proposed information technology project;

calculate, based on the plurality of responses input via the user interface comprising the plurality of questions regarding the proposed information technology project, an initial risk assessment score for the proposed information technology project;

determine whether the initial risk assessment score for the proposed information technology project meets a predetermined threshold; and responsive to determining that the initial risk assessment score for the proposed information technology project does not meet the predetermined threshold:

generate a risk assessment summary report indicating that the initial risk assessment score for the proposed information technology project does not meet the predetermined threshold and comprising a summary of the responses input via the user interface comprising the plurality of questions regarding the proposed information technology project; and communicate, to the computing device, the risk assessment summary report indicating that the initial risk assessment score for the proposed information technology project does not meet the predetermined threshold and comprising the summary of the responses input via the user interface comprising the plurality of questions regarding the proposed information technology project.

15. An apparatus comprising:

at least one processor; and a memory comprising a proposed information technology project risk assessment module and storing instructions that when executed by the at least one processor cause the apparatus to:

generate a user interface comprising a plurality of questions regarding a proposed information technology project;

establish, via a communication interface, a communications link between the apparatus and a computing device;

while the communications link between the apparatus and the computing device is active, communicate, to the computing device, the user interface comprising the plurality of questions regarding the proposed information technology project, wherein communicating the user interface comprising the plurality of questions regarding the proposed information technology project causes the computing device to display the user interface comprising the plurality of questions regarding the proposed information technology project;

receive, from the computing device, a plurality of responses input via the user interface comprising the plurality of questions regarding the proposed information technology project, wherein each of the plurality of responses input via the user interface comprising the plurality of questions regarding the proposed information technology project corresponds to one or more of the plurality of questions regarding the proposed information technology project;

calculate, based on the plurality of responses input via the user interface comprising the plurality of questions regarding the proposed information technology project, an initial risk assessment score for the proposed information technology project;

determine whether the initial risk assessment score for the proposed information technology project meets a predetermined threshold; and responsive to determining that the initial risk assessment score for the proposed information technology project meets the predetermined threshold:

generate a user interface comprising a plurality of question sets, each question set of the plurality of question sets comprising one or more questions relating to a question of the plurality of questions regarding the proposed information technology project;

communicate, to a different computing device, the user interface comprising the plurality of question sets, wherein communicating the user interface comprising the plurality of question sets causes the different computing device to display the user interface comprising the plurality of question sets;

receive, from the different computing device, a plurality of responses input via the user interface comprising the plurality of question sets, wherein each of the plurality of responses input via the user interface comprising the plurality of question sets corresponds to a question of the plurality of question sets; and calculate, based on the plurality of responses input via the user interface comprising the plurality of question sets, an adjusted risk assessment score for the proposed information technology project by adjusting the initial risk assessment score for the proposed information technology project based on the plurality of responses input via the user interface comprising the plurality of question sets.

16. One or more non-transitory computer-readable media having instructions stored thereon, that when executed by a computing platform comprising at least one processor and a memory comprising a proposed information technology project risk assessment module, cause the computing platform to:

generate a user interface comprising a plurality of questions regarding a proposed information technology project;
establish, via a communication interface, a communications link between the computing platform and a computing device;
while the communications link between the computing platform and the computing device is active, communicate, to the computing device, the user interface comprising the plurality of questions regarding the proposed information technology project, wherein communicating the user interface comprising the plurality of questions regarding the proposed information technology project causes the computing device to display the user interface comprising the plurality of questions regarding the proposed information technology project;
receive, from the computing device, a plurality of responses input via the user interface comprising the plurality of questions regarding the proposed information technology project, wherein each of the plurality of responses input via the user interface comprising the plurality of questions regarding the proposed information technology project corresponds to one or more of the plurality of questions regarding the proposed information technology project;
calculate, based on the plurality of responses input via the user interface comprising the plurality of questions regarding the proposed information technology project, an initial risk assessment score for the proposed information technology project;
determine whether the initial risk assessment score for the proposed information technology project meets a predetermined threshold; and
responsive to determining that the initial risk assessment score for the proposed information technology project does not meet the predetermined threshold:
  generate a risk assessment summary report indicating that the initial risk assessment score for the proposed information technology project does not meet the predetermined threshold and comprising a summary of the responses input via the user interface comprising the plurality of questions regarding the proposed information technology project; and
  communicate, to the computing device, the risk assessment summary report indicating that the initial risk assessment score for the proposed information technology project does not meet the predetermined threshold and comprising the summary of the responses input via the user interface comprising the plurality of questions regarding the proposed information technology project.

17. One or more non-transitory computer-readable media having instructions stored thereon, that when executed by a computing platform comprising at least one processor and a memory comprising a proposed information technology project risk assessment module, cause the computing platform to:
generate a user interface comprising a plurality of questions regarding a proposed information technology project;
establish, via a communication interface, a communications link between the computing platform and a computing device;
while the communications link between the computing platform and the computing device is active, communicate, to the computing device, the user interface comprising the plurality of questions regarding the proposed information technology project, wherein communicating the user interface comprising the plurality of questions regarding the proposed information technology project causes the computing device to display the user interface comprising the plurality of questions regarding the proposed information technology project;
receive, from the computing device, a plurality of responses input via the user interface comprising the plurality of questions regarding the proposed information technology project, wherein each of the plurality of responses input via the user interface comprising the plurality of questions regarding the proposed information technology project corresponds to one or more of the plurality of questions regarding the proposed information technology project;
calculate, based on the plurality of responses input via the user interface comprising the plurality of questions regarding the proposed information technology project, an initial risk assessment score for the proposed information technology project;
determine whether the initial risk assessment score for the proposed information technology project meets a predetermined threshold; and
responsive to determining that the initial risk assessment score for the proposed information technology project meets the predetermined threshold:
  generate a user interface comprising a plurality of question sets, each question set of the plurality of question sets comprising one or more questions relating to a question of the plurality of questions regarding the proposed information technology project;
  communicate, to a different computing device, the user interface comprising the plurality of question sets, wherein communicating the user interface comprising the plurality of question sets causes the different computing device to display the user interface comprising the plurality of question sets;
  receive, from the different computing device, a plurality of responses input via the user interface comprising the plurality of question sets, wherein each of the plurality of responses input via the user interface comprising the plurality of question sets corresponds to a question of the plurality of question sets; and
  calculate, based on the plurality of responses input via the user interface comprising the plurality of question sets, an adjusted risk assessment score for the proposed information technology project by adjusting the initial risk assessment score for the proposed information technology project based on the plurality of responses input via the user interface comprising the plurality of question sets.

* * * * *